Feb. 20, 1934.    H. S. WOODRUFF    1,947,632
CENTRIFUGALLY ACTUATED CLUTCH
Filed March 18, 1933

Inventor:
Henry S. Woodruff,
by Charles E. Mullen
His Attorney.

Patented Feb. 20, 1934

1,947,632

UNITED STATES PATENT OFFICE 1,947,632

CENTRIFUGALLY ACTUATED CLUTCH

Henry S. Woodruff, Schenectady, N. Y., assignor to General Electric Company, a corporation of New York Application March 18, 1933. Serial No. 661,516

13 Claims. (Cl. 192—105)

My invention relates to centrifugally actuated clutches, and to centrifugally actuated mechanisms.

An object of my invention is to provide a centrifugally actuated clutch of simple and compact construction.

Another object of my invention is to provide a centrifugally actuated clutch having a plurality of clutch actuating members and an arrangement whereby the actuating forces of the several members are maintained equal.

A further object of my invention is to provide a centrifugally actuated mechanism which may be readily manufactured of pressed metal parts and which will operate with a snap action when it has attained a predetermined speed and return to its initial position when its speed is reduced below the predetermined operating speed.

Further objects and advantages of my invention will become apparent as the following description proceeds and the features of novelty which characterize my invention will be pointed out with particularity in the claims annexed to and forming a part of this specification.

Figure 1:
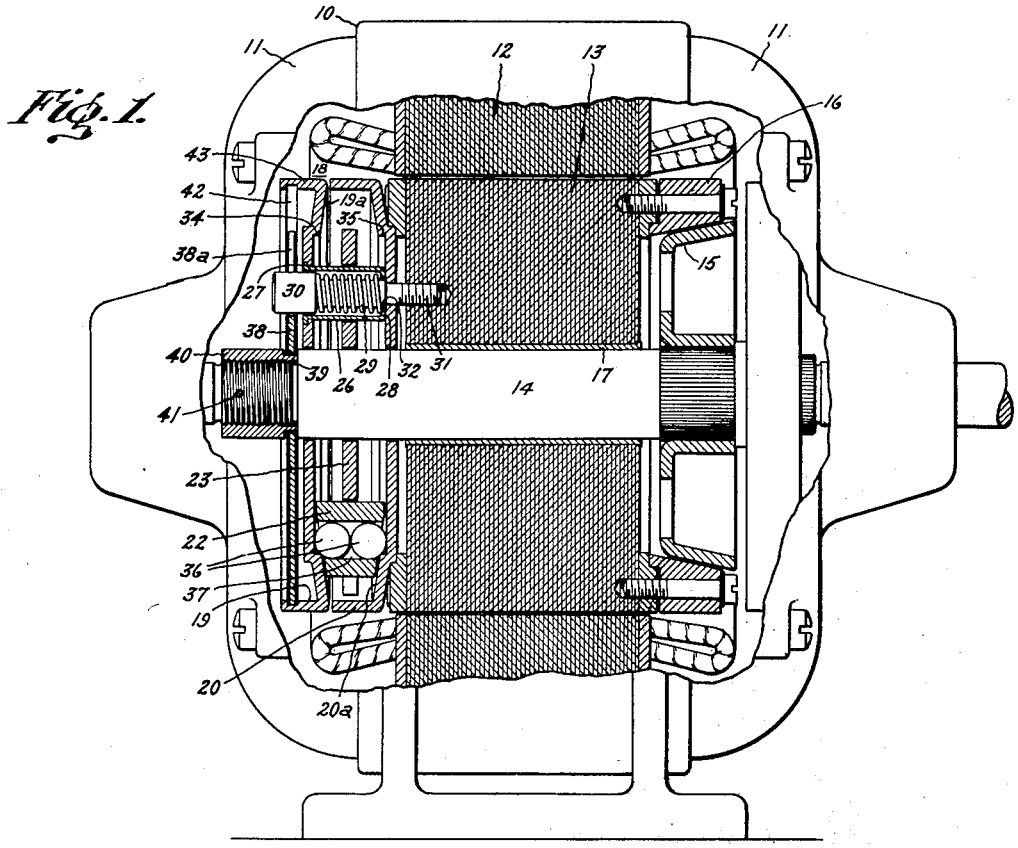
Figure 2:
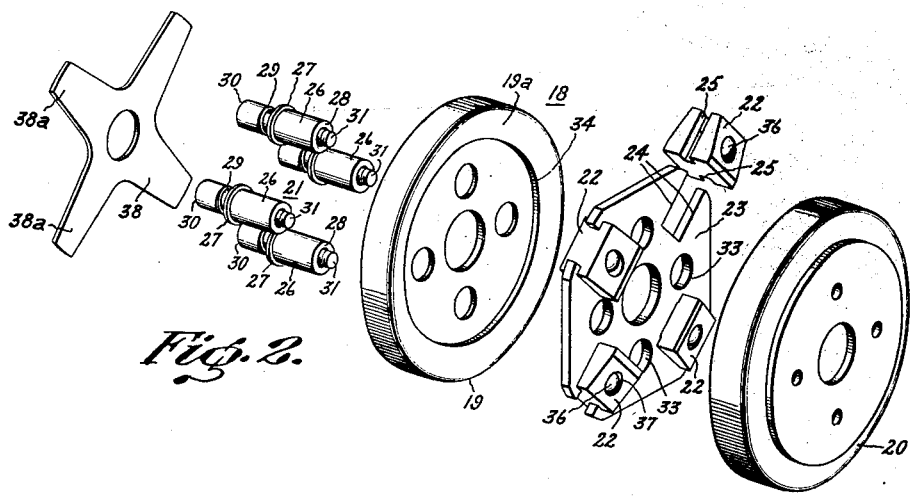

For a better understanding of my invention, reference may be had to the accompanying drawing in which Fig. 1 is a sectional side elevation of an electric motor provided with a clutch constructed in accordance with my invention, and Fig. 2 is a perspective view of the several parts of the centrifugal clutch actuating mechanism separated and arranged in the order of their assembly.

Referring to the drawing, in Fig. 1, I have shown an electric motor having a centrifugally actuated clutch embodying my invention. This motor includes a frame 10 having end shields 11, a core structure 12 carried by the frame 10, and a rotor 13 mounted on a shaft 14 of the motor, which is supported in bearings in the end shields 11.

In accordance with my invention, a clutch is provided for suddenly connecting the rotor 13 with the shaft 14 after the rotor has attained a predetermined speed in order to start the load with minimum starting current. In the particular construction illustrated, as an example of one manner of carrying out my invention, a driven clutch member or cone 15 is secured to the shaft 14 of the motor, and a ring-shaped driving member 16 is secured to the rotor 13. The rotor 13 is provided with a bearing 17 and is slidably mounted on the shaft 14 and rotatable with respect thereto. The driving connection between the rotor and the shaft is established by operation of a centrifugally actuated mechanism 18 embodying my invention. This centrifugally actuated mechanism is arranged to move the rotor 13 axially along the shaft 14 after the rotor has attained a predetermined speed and thereby to engage the members 15 and 16 of the clutch to apply the full kinetic energy of the rotor 13 to start the load connected to the shaft 14.

The centrifugally actuated mechanism 18, as shown in Fig. 2, comprises two plates or discs 19 and 20 having outwardly converging annular faces 19a and 20a respectively, a plurality of spring assemblies 21 for urging the discs 19 and 20 together, a plurality of outwardly movable weights 22 for forcing the discs apart on outward movement, and a guide plate or support 23 having radial guiding edges 24 engaging grooves 25 in the weights for retaining the weights in spaced relation and for guiding their radial outward movement. Each of the spring assemblies 21 includes a sleeve 26 having an outwardly turned flange 27 at one end secured in an opening in the disc 19 and an inwardly turned flange 28 at the other hand. A helical spring 29 is compressed between the flange 28 and a head 30 of a pin or bolt 31 passing through the sleeve 26 and being threaded into the rotor 13 and having a shoulder 32, shown in Fig. 1, by which the disc 20 is rigidly secured to the rotor 13. The spring assemblies 21 also pass through openings 33 in the weight support 23 and secure the discs 19 and 20 and the weights 85 in their supports so that they will rotate with the driving member about the shaft 14, the discs forming a casing about the support and weights.

In order that the centrifugal mechanism 18 will operate with a sudden or snap action, each of the discs 19 and 20 is provided with an annular ridge or shoulder 34 and 35, respectively, and each of the weights is provided with a pair of inter-engaging balls 36 mounted in a transverse cylindrical bore 37 in the weights. These inter-engaging balls extend beyond from each side of the weights and are so positioned that in the retracted position of the weights they rest against the shoulders 34 and 35 which act as yieldable stops because of the resilient action of the springs 29. From this construction it is seen that before the weights can move outwardly the inter-engaging balls 36 must ride up over the shoulders 34 and 35 upon the converging faces 19a and 20a of the discs 19 and 20. The several elements of the centrifugally actuated mechanism are so designed that the inter-engaging balls 36 will not ride up over the shoulders 34 and 35 until the motor has attained a predetermined speed at which it is desired to connect it to the load. When this predetermined speed has been attained the balls will ride up over the shoulders 34 and 35 and force the plates 19 and 20 apart. The separation of the discs or plates 19 and 20 is utilized in the construction shown to force the rotor 13 axially along the shaft 14 to engage the clutch members 15 and 16 and to establish a driving connection between the rotor and the shaft. In order to accomplish this result I provide a flat spring 38 having arms 38a and rotatably mounted in an annular groove 39 formed by the shaft 14 and a reduced portion of a sleeve 40 which is threaded onto the shaft 14 and secured in position by a pin 41. The arms 38a engage an internal annular groove 42 cut in a flange 43 in the disc 19 and resiliently transmit the force produced by the centrifugal device 18 to the shaft 14 and hence resist axial movement of the discs 19 and 20. When the discs are forced apart by outward movement of the weights the disc 20 and the rotor 13 are forced axially along the shaft 14 and the clutch members 15 and 16 are thereby engaged. This resilient connection 38 between the disc 19 and the shaft 14 is employed in order to equalize the effects of the forces exerted by the several weights in the event there is any inaccuracy in the parts of the mechanism or unequal wear in the clutch members. Should the speed of the rotating parts be reduced below a certain value, the force of the springs 29 will act through the converging faces 19a and 20a of the discs sufficiently to force the weights against centrifugal force back into their retracted position inside the shoulders 34 and 35 and will disengage the clutch members 15 and 16, leaving the motor-rotor 13 free to come up to the required speed to operate the centrifugal mechanism again. This cycle will be repeated until the load has attained sufficient speed not to slow down the rotor, under which conditions the clutch will remain engaged.

From the foregoing it is apparent that I have provided a centrifugally actuated clutch of simple and compact construction which will operate with a snap action and in which the forces of a plurality of centrifugal members are equalized.

Although I have shown my invention as applied to an electric motor, it will be apparent that it is applicable to other devices in which a delayed action is desired. I do not, therefore, desire my invention to be limited to the arrangement shown and described, and I intend in the appended claims to cover all modifications thereof which do not depart from the spirit and scope of my invention.

What I claim as new and desire to secure by Letters Patent of the United States is:

1. A centrifugally actuated mechanism including an axially movable plate, means for resisting axial movement of said plate, means including an outwardly movable weight rotatable with said plate for moving said plate axially against said resisting means, said last mentioned means including a pair of interengaging balls carried by said weight and engaging said plate, and means including a shoulder on said plate for preventing outward movement of said weight until said driving member has attained a predetermined speed.

2. A centrifugally actuated mechanism including plates axially movable with respect to each other, means for urging said plates together, means including a plurality of outwardly movable weights for forcing said plates apart, annular shoulders on said plates, and means including pairs of interengaging balls engaging said shoulders for preventing outward movement of said weights until said centrifugally actuated mechanism has attained a predetermined speed.

3. A centrifugally actuated mechanism including a plurality of outwardly movable weights, means including a support having radially extending weight guides for supporting said weights, plates forming a casing about said support and said weights, means for resiliently urging said plates together against the action of said weights and for securing said plates and weights together, and means including a plurality of balls arranged in and extending from said weights for forcing said converging plates apart upon outward movement of said weights.

4. A centrifugally actuated mechanism including a pair of plates, means extending between said plates for resiliently urging said plates together, means including an outwardly movable weight for forcing said plates apart when said mechanism has attained a predetermined speed, and means including a support for guiding said weight radially, said last mentioned means being carried by said means for resiliently urging said plates together.

5. A centrifugally actuated mechanism including a pair of outwardly converging plates, a sleeve secured to one of said plates and extending toward the other of said plates, a pin extending through said sleeve and secured to said other plate, means including a spring arranged between said pin and said sleeve for resiliently urging said plates together, means including an outwardly movable weight for forcing said plates apart when said mechanism has attained a predetermined speed, and means including a support engaging said sleeve for guiding said weight radially and for providing a driving connection between said weight and said driving member.

6. A centrifugally actuated mechanism including rotatable plates, resilient means for urging said plates together, means including a plurality of weights movable outwardly by centrifugal force for forcing said plates axially apart, a flange on one of said plates, and means including a spring having arms engaging said flange for actuating a device associated with said mechanism upon outward movement of said weights.

7. A clutch including a driving member and a driven member, centrifugally actuated means including a plurality of outwardly movable weights for connecting said members, yieldable stops secured for rotation with said driving member and arranged adjacent said weights, and means including pairs of interengaging balls arranged in said weights and engaging said stops for restraining the outward movement of said weights until said driving member has attained a predetermined speed.

8. A clutch including a driving member and a driven member, centrifugally actuated means including a plurality of outwardly movable weights for connecting said members, yieldable plates arranged on either side of said weights, stops on said plates, and means including pairs of interengaging balls arranged in said weights and engaging said stops for restraining the outward movement of said weights until said driving member has attained a predetermined speed.

9. A clutch including a driving member and a driven member, centrifugally actuated means including a plurality of outwardly movable weights for establishing a driving connection between said members, plates at the sides of said weights, said weights and said plates being secured for rotation with said driving member, means for urging said plates together against said weights, stops on said plates, and means including pairs of interengaging balls arranged in said weights and engaging said stops for restraining the outward movement of said weights until said driving member has attained a predetermined speed.

10. A clutch including a driving member and a driven member, centrifugally actuated means including a plurality of outwardly movable weights for establishing a driving connection between said members, outwardly converging plates enclosing said weights, means for urging said plates together against said weights, stops on said plates, one of said plates being axially movable with respect to said driving member, means including a spring for equalizing the forces exerted against said plates by said weights, and means including pairs of interengaging balls arranged in said weights and engaging said stops for restraining the outward movement of said weights until said driving member has attained a predetermined speed.

11. A clutch including a driving member and a driven member, centrifugally actuated means including a plurality of outwardly movable weights for connecting said members, a supporting plate having radial guides engaging said weights, two outwardly converging plates enclosing said weights, one of said outwardly converging plates being rigidly secured to said driving member and the other being movable axially with respect thereto, means for urging said axially movable plate toward said rigidly secured plate and for holding said weights in a retracted position, resilient means for limiting the axial movement of said movable plate, a pair of interengaging balls arranged in transverse guides in each of said weights, and means including stops on said converging plates engaging said balls for restraining the outward movement of said weights until said driving member has attained a predetermined speed.

12. A clutch including a driving member and a driven member, a pair of plates mounted to rotate with said driving member, said plates each having an annular shoulder and being inclined toward each other outwardly from said shoulders, one of said plates being rigidly secured to said driving member, the other of said plates being movable axially with respect to said driving member, means for urging said plates toward each other, means including a plurality of centrifugally actuated outwardly movable weights for forcing said plates apart and for connecting said members, and means including pairs of interengaging balls arranged in said weights and engaging said shoulders for restraining the outward movement of said weights until said driving member has attained a predetermined speed.

13. In combination with an electric motor having a shaft and a rotor rotatably mounted on said shaft, a clutch including a driving member secured to said rotor and a driven member secured to said shaft, centrifugally actuated means for moving said rotor axially and for connecting said driving and driven members, said means including two plates one secured to said rotor and one axially movable with respect thereto, springs urging said plates together, means including a resilient connection between said axially movable plate and said driving member for actuating said clutch, annular shoulders on said plates, means including a plurality of weights movable outwardly for forcing said plates axially apart, and means including pairs of interengaging balls carried by said weights and engaging said shoulders for restraining the outward movement of said weights until said rotor has attained a predetermined speed.

HENRY S. WOODRUFF.